F. E. LACK.
WHIFFLETREE.
APPLICATION FILED AUG. 25, 1913.

1,149,372.  Patented Aug. 10, 1915.

Witnesses:
Inventor
Finis E. Lack
Attorney

UNITED STATES PATENT OFFICE.

FINIS E. LACK, OF PADUCAH, KENTUCKY.

WHIFFLETREE.

1,149,372.     Specification of Letters Patent.     Patented Aug. 10, 1915.

Application filed August 25, 1913. Serial No. 786,350.

*To all whom it may concern:*

Be it known that I, FINIS E. LACK, a citizen of the United States, residing at Paducah, in the county of McCracken and State of Kentucky, have invented certain new and useful Improvements in Whiffletrees, of which the following is a specification.

My invention relates to improvements in whiffletrees, the primary object of the invention being to provide a generally improved whiffletree of exceedingly simple, durable, and efficient construction, better adapted to its intended purposes than any other device of the same class with which I am acquainted.

A further object is to provide a metallic whiffletree of improved form adapted to give it great strength together with an improved truss-rod or member for coöperating with the tree-bar and still further strengthening the latter.

A still further object is to improve the construction of the whiffletree hooks and the arrangement and combination of the latter with the tree-bar whereby the ends of the latter are adapted to close the hooks and have abutting contact or engagement therewith when the hooks are under tension or in a pendant position by reason of the suspension of the whiffletree bar.

A still further object is to provide an improved self-closing or gravity locking hook having a plurality of abutments (in the present instance three in number) adapted to contact or interlock with adjacent parts of the whiffletree for the purpose of receiving and distributing the strains or stresses on the hook when in its closed or operative position thereby greatly relieving the pivoted or bearing portion of the hook from strain or wear.

A still further object is to provide an improved whiffletree hook so arranged and disposed relative to the ends of the whiffletree as to be stopped in its respective open and closed positions, and when the whiffletree is in a suspended or substantially vertical position, to drop into a closed position and when in its closed position will not present any dangerous or undesirable projecting points to injure the draft animal or to come into contact with or injure the adjacent or contiguous parts such as growing corn or the like as in plowing or cultivating, or other use.

With the above mentioned and other ends in view, the invention consists in the novel construction, arrangement, and combination of parts, hereinafter described, illustrated in one of its embodiments in the accompanying drawings, and particularly pointed out in the appended claims.

Figure 1:
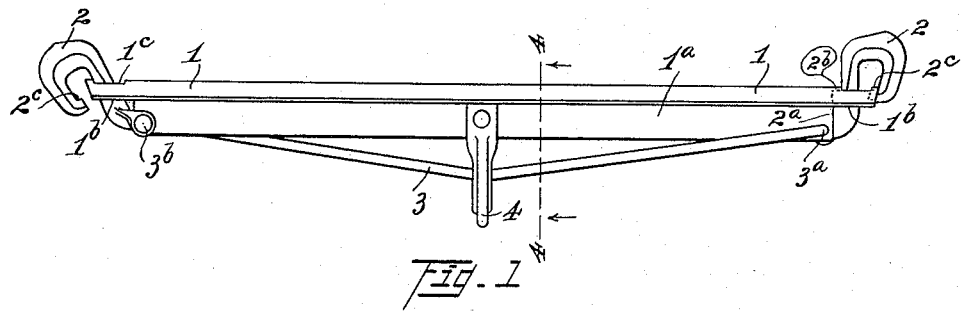
Figure 2:
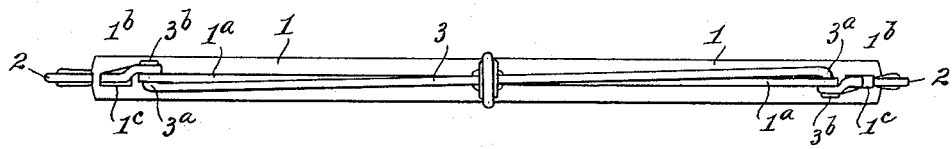
Figure 3:
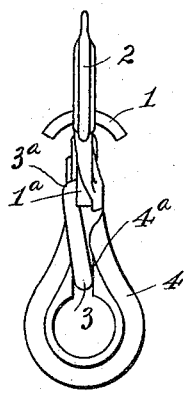
Figure 4:
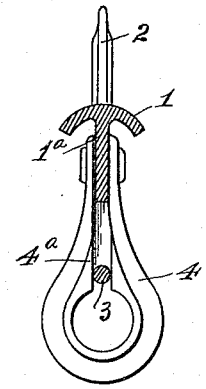
Figure 5:
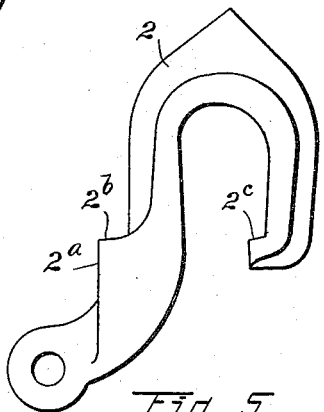

Referring to the drawings forming a part of this specification, Figure 1, is a top plan view of the improved whiffletree, the left hand hook being shown in its open position, and the right hand hook in its closed or operative position, as when in use or when the whiffletree is in a suspended position. Fig. 2, a rear view of the improved whiffletree. Fig. 3, an enlarged end view of same. Fig. 4, an enlarged cross sectional view taken on line 4—4 of Fig. 1. Fig. 5, an enlarged detailed view of one of the improved whiffletree hooks, detached.

Similar numerals of reference designate like parts throughout all the figures of the drawings.

The improved whiffletree comprises a tree-bar, formed, in the present instance, of a substantially T-shaped bar the head 1 being preferably curved or oval shaped, and the web portion $1^a$ cut away or inset from the ends of the bar 1 as at $1^b$.

The ends of the bar are provided with hook-receiving openings or slots $1^c$ adapted to receive and contain the shank portions of the hooks 2, said hooks being pivoted at the rear of the openings or slots $1^c$, to the ends of the web member $1^a$ and have a free but limited movement in the slot openings $1^c$ so that the hooks are adapted to swing longitudinally of the axis or plane of the tree bar.

The pivoted portions of the hooks, in the present instance, are secured to the web ends of the portion $1^a$ of the bar by means of the ends $3^a$ of a truss-rod or bar 3, said ends $3^a$ passing through suitable openings in the web $1^a$ and forming bearings for the bearing portions of the hooks 2. The ends $3^a$ are riveted or upset as at $3^b$ and the middle portion of the truss-bar or rod extends through and is seated in a recess $4^a$ of the whiffletree clevis 4.

As a means for taking up and distributing the strains or stresses of the hook upon adjacent parts of the tree-bar, and greatly relieving the pivoted or bearing portion of the hook when the latter is in use and under tension, the hook is provided with a plurality of bearing points or abutments (in the present instance three in number) the bearing portion or abutment 2ª being adapted to come into engagement with the adjacent end of the web 1ª, the abutment 2ᵇ being adapted to contact or interlock with the head 1 (see Fig. 1) adjacent the inner side of the slot opening 1ᶜ, and the abutment or inturned portion 2ᶜ at the free or tip end of the hook being adapted to come into engagement or interlock with the adjacent end of the head 1, of the T-bar, at the outer side of the slot opening 1ᶜ.

By reason of the construction above described it will be seen that the hooks 2 have a free but limited longitudinal movement within the openings or slots 1ᶜ and that by pulling the same outwardly to an open position as indicated at the left hand side of Figs. 1 and 2 the trace may be readily admitted through the mouth of the hook, and upon the return of the latter by tension or gravity same will be closed by the adjacent end of the whiffletree bar.

From the foregoing description, taken in connection with the accompanying drawings, the operation and advantages of my invention will be readily understood.

Having thus described one of the embodiments of my invention, what I claim and desire to secure by Letters Patent is,—

1. A whiffletree, comprising a tree-bar having hook receiving openings at its ends, and pivoted hooks having their shank portions extending through and having a limited to and fro movement in said openings, said shanks being provided with inwardly extending pivot relieving abutments normally interlocking with the rear portions of said bar.

2. A whiffletree, comprising a T-shaped tree-bar provided with hook receiving openings and having the ends of its web portion cut away at the rear of said openings, and hooks having shank portions pivotally secured to the ends of said web portion and provided with abutments normally in engagement with the ends of said web portion and interlocking with said tree-bar at the inner sides of said openings.

3. A whiffletree, comprising a T-shaped tree-bar provided with hook receiving openings and having the ends of its web portion cut away at the rear of said openings, and hooks provided with shanks extending through said openings and pivotally secured to the ends of said web portions, said shanks being provided with pivot relieving abutments normally engaging with the ends of said tree-bar at the rear of said openings.

4. A whiffletree, comprising a T-bar provided with hook-receiving openings, hooks extending through and having limited longitudinal movements in said openings, a truss-rod connected to said hooks and the web portion of said T-bar, said hooks being normally closed by and having abutments in engagement with said bar whereby to relieve the pivoted portions of said hooks from strain, and wear.

5. A whiffletree, comprising a T-shaped tree-bar provided with hook-receiving openings and having the ends of its web portion cut away at the rear of said openings, hooks pivotally secured to the ends of said web portion and extending through said openings and having abutments in engagement with said tree-bar when in a closed position, and a truss-rod connected to the ends of said web portion of said tree-bar.

6. In combination; a swingle-tree having a vertically extending forwardly disposed portion at each end thereof, and a hook at each end of said swingletree, each of said hooks being pivoted to said tree and being provided with shouldered shank and bill portions arranged for simultaneous engagement with the respective vertical portions.

In testimony whereof I have affixed my signature in presence of two witnesses.

FINIS E. LACK.

Witnesses:
R. S. PIERCE,
O. C. BILLMAN.

Copies of this patent may be obtained for five cents each, by addressing the "Commissioner of Patents, Washington, D. C."